US005104749A

United States Patent [19]

[11] Patent Number: 5,104,749

[45] Date of Patent: Apr. 14, 1992

Sato et al.

[54] ORGANIC ELECTROLUMINESCENT DEVICE

[75] Inventors: Yoshiharu Sato, Sagamihara; Masayuki Yajima, Yokohama; Tetsuo Murayama, Tokyo; Hitoshi Ono, Yokohama, all of Japan

[73] Assignee: Mitsubishi Kasei Corporation, Tokyo, Japan

[21] Appl. No.: 527,366

[22] Filed: May 23, 1990

[30] Foreign Application Priority Data

May 25, 1989 [JP] Japan .................................. 1-132425

[51] Int. Cl.[5] .............................................. A01J 63/04

[52] U.S. Cl. .................................... 428/690; 428/917; 313/503; 313/504

[58] Field of Search ............... 313/503, 504, 505, 506, 313/509; 428/917, 690

[56] References Cited

U.S. PATENT DOCUMENTS

| | | | |
|---|---|---|---|
| 4,356,429 | 10/1982 | Tang | 313/503 |
| 4,539,507 | 9/1985 | VanSlyke et al. | 313/503 |
| 4,672,265 | 6/1987 | Eguchi et al. | 313/504 |
| 4,769,292 | 9/1988 | Tang et al. | 428/690 |

OTHER PUBLICATIONS

Tang et al., *Appl. Phys. Lett.* 51(12), 913–915 (21 Sep. 1987).

Tang et al., *J. Appl. Phys.* 65(9), 3610–3616 (1 May 1989).

Adachi et al., *Japanese J. Appl. Phys.* 27(4), L713–L715 (Apr. 1988).

Adachi et al., *Japanese J. Appl. Phys.* 27(2), L269–L271 (Feb. 1988).

*Primary Examiner*—James J. Seidleck
*Assistant Examiner*—Charles R. Nold
*Attorney, Agent, or Firm*—Oblon, Spivak, McClelland, Maier & Neustadt

[57] ABSTRACT

An organic electroluminescent device having an organic hole injection transport layer and an organic luminescent layer formed between two conductive layers constituting electrodes, wherein the organic hole injection transfer layer contains a hydrazone compound of the following formula (I):

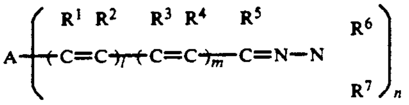

(I)

wherein A is a monovalent or bivalent organic group containing at least one aromatic hydrocarbon ring or aromatic hetero ring which may have a substituent, each of $R^1$, $R^2$, $R^3$, $R^4$ and $R^5$ is a hydrogen atom, or an alkyl, aralkyl, aromatic hydrocarbon or heterocyclic group which may have a substitutent, each of $R^6$ and $R^7$ is an alkyl, aralkyl, aryl, aromatic hydrocarbon or heterocyclic group which may have a substituent, l is an integer of 0 or 1, m is an integer of 0, 1 or 2, and n is an integer of 1 or 2, provided that A, $R^1$ and the carbon atom to which $R^1$ is bonded, or $R^6$, $R^7$ and the nitrogen atom to which $R^6$ and $R^7$ are bonded, may bond to one another to form a ring.

10 Claims, 1 Drawing Sheet

ORGANIC ELECTROLUMINESCENT DEVICE

Figure 1:
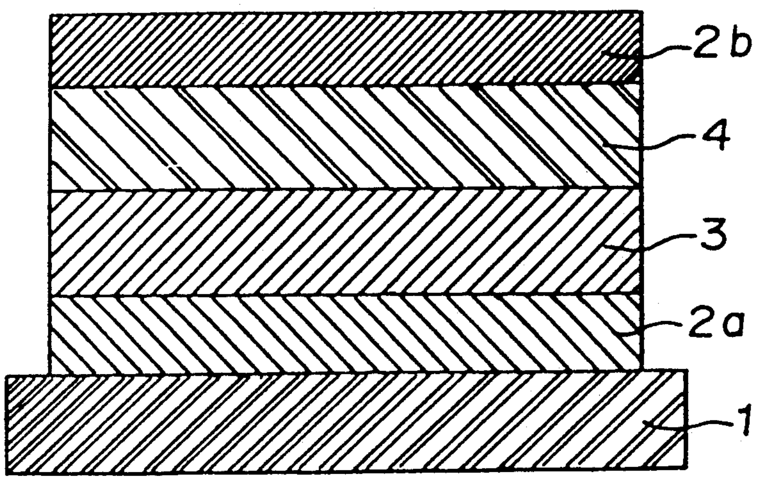

The present invention relates to an organic electroluminescent device. More particularly, it relates to a thin film type device comprising a combination of a hole injection transport layer and a luminescent layer made of organic compounds, respectively, which is designed to emit light upon application of an electric field. Heretofore, it has been common that thin-film type electroluminescent devices are made of inorganic material which is obtained by doping Mn or a rare earth element (such as Eu, Ce, Tb or Sm) as the luminous center to a semiconductor of a Group II-VI compound such as ZnS, CaS or SrS. However, the electroluminescent devices prepared from such inorganic material, have problems such that 1) alternate current driving is required (about 1 KHz), 2) the driving voltage is high (about 200 V), 3) it is difficult to obtain full coloring, and 4) the cost for peripheral driving circuits is high.

In order to overcome such problems, there have been activities, in recent years, to develop electroluminescent devices using organic materials. As the materials for the luminescent layer, in addition to anthracene and pyrene which were already known, cyanine dyes (J. Chem. Soc., Chem. Commun., 557, 1985), pyrazoline (Mol. Cryst. Liq. Cryst., 135, 355, (1986)), perillene (Jpn. J. Appl. Phys., 25, L773, (1986)) or coumarin compounds and tetraphenylbutadiene (Japanese Unexamined Patent Publication No. 51781/1982), have been reported. Further, it has been proposed to optimize the type of electrodes or to provide a hole injection transport layer and a luminescent layer composed of an organic phosphor, for the purpose of improving the injection efficiency of a carrier from the electrodes in order to increase the luminous efficiency (Japanese Unexamined Patent Publications No. 51781/1982, No. 194393/1984 and No. 295695/1988). However, with the organic electroluminescent devices disclosed in these references, the light emitting performance is still inadequate. And further improvements are desired.

The present invention is based on a discovery of a new fact that in an organic electroluminescent device, a certain hydrazone compound is suitable for use as an organic hole injection transport material capable of emitting light of high luminance even at a low driving voltage.

Thus, the present invention provides an organic electroluminescent device having an organic hole injection transport layer and an organic luminescent layer formed between two conductive layers constituting electrodes, wherein the organic hole injection transport layer contains a hydrazone compound of the following formula (I):

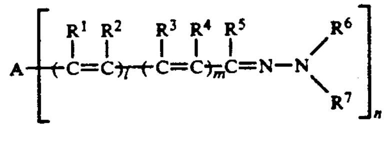

(I)

wherein A is a monovalent or bivalent organic group containing at least one aromatic hydrocarbon ring or aromatic hetero ring which may have a substituent, each of $R^1$, $R^2$, $R^3$, $R^4$ and $R^5$ is a hydrogen atom, or an alkyl, aralkyl, aromatic hydrocarbon or heterocyclic group which may have a substituent, each of $R^6$ and $R^7$ is an alkyl, aralkyl, aryl, aromatic hydrocarbon or heterocyclic group which may have a substituent, l is an integer of 0 or 1, m is an integer of 0, 1 or 2, and n is an integer of 1 or 2, provided that A, $R^1$ and the carbon atom to which $R^1$ is bonded, or $R^6$, $R^7$ and the nitrogen atom to which $R^6$ and $R^7$ are bonded, may bond to one another to form a ring.

Now, the electroluminescent device of the present invention will be described with reference to the accompanying drawing.

FIG. 1 is a cross sectional view schematically illustrating the structure of an electroluminescent device of the present invention, in which reference numeral 1 indicates a substrate, numerals 2*a* and 2*b* indicate conductive layers, numeral 3 indicates a hole injection transport layer, and numeral 4 indicates a luminescent layer.

The substrate 1 constitutes a support for the electroluminescent device of the present invention and may be made of a quartz or glass sheet, a metal sheet or foil, or a plastic film or sheet. However, it is preferred to employ a glass sheet or a substrate made of a transparent synthetic resin such as polyester, polymethacrylate, polycarbonate or polysulphone. On the substrate 1, a conductive layer 2*a* is provided. Such a conductive layer 2*a* is usually made of a metal such as aluminum, gold, silver, nickel, palladium or tellurium, a metal oxide such as an oxide of indium and/or tin, copper iodide, carbon black or a conductive resin such as poly(3-methylthiophene). The conductive layer is usually formed by sputtering or vacuum deposition. However, in the case of fine particles of a metal such as silver, copper iodide, carbon black, fine particles of conductive metal oxide or fine conductive resin powder, such material may be dispersed in a suitable binder resin solution and coated on a substrate to form the conductive layer. Further, in the case of a conductive resin, a thin film may directly be formed on a substrate by electrolytic polymerization.

This conductive layer may be made to have a multi-layered structure by depositing different types of materials among the above mentioned materials. The thickness of the conductive layer 2*a* varies depending upon the required transparency. When transparency is required, the transmittance of visible light is usually at least 60%, preferably at least 80%. In such a case, the thickness of the conductive layer is usually from 50 to 10,000 Å, preferably from 100 to 5,000 Å. When it may be opaque, the conductive layer 2*a* may also serve as the substrate 1. Also in this case, the conductive layer may be made to have a multi-layered structure of different types of materials, as mentioned above. In the embodiment of FIG. 1, the conductive layer 2*a* plays a hole injection role as an anode.

On the other hand, the conductive layer 2*b* plays a role of injecting electrons to the luminescent layer 4 as a cathode. As the material to be used as the conductive layer 2*b*, the same material as mentioned above with respect to the conductive layer 2*a*, may be employed. However, in order to promote the electron injection efficiently, it is preferred to employ a metal having a low value of work function. In this respect, a suitable metal such as tin, magnesium, indium, aluminum or silver, or their alloys may be employed. The thickness of the conductive layer 2*b* is usually the same as the conductive layer 2*a*. Although not shown in FIG. 1, a substrate like the substrate 1 may further be provided on the conductive layer 2*b*. However, at least one of the conductive layers 2a and 2b is required to have good transparency for an electroluminescent device. In this respect, one of the conductive layers 2a and 2b is desired to have good transparency preferably with a thickness of from 100 to 5,000 Å.

On the conductive layer 2a, a hole injection transport layer 3 is formed. The hole injection transport layer 3 is formed of a compound which is capable of efficiently transporting a hole from the anode towards the luminescent layer between the electrodes to which an electric field is applied.

Such a hole injection transport compound is required to be a compound having a high efficiency for injecting a hole from the conductive layer 2a and being capable of efficiently transporting the injected hole. For this purpose, it is required to be a compound having a small ionization potential, a large hole mobility and a stability, whereby impurities likely to form traps, are hardly formed during the preparation or use, and the stability as a film is high. The electroluminescent device of the present invention is characterized in that such a hole injection transport compound is selected from the hydrazone compounds of the above formula (I).

In the above formula (I), A is a monovalent or bivalent organic group containing at least one aromatic hydrocarbon ring or aromatic hetero ring. The organic group may be the one containing a plurality of rings, or the one forming a condensed multi-ring. Such an organic group may, for example, be a group formed from a hydrocarbon, such as a monovalent or bivalent aromatic hydrocarbon group derived from e.g. benzene, naphthalene, anthracene, pyrene, perylene, phenanthrene, fluoranthene, acenaphthene, acenaphthylene, azulene, fluorene, indene, tetracene or naphthacene; a group containing in addition to carbon atoms other types of atoms, such as a monovalent or bivalent aromatic heterocyclic group derived from e.g. pyrrole, thiophene, furan, indole, carbazole, pyrazole, pyridine, acridine, phenazine, benzothiophene or benezofuran; and a condensed polycyclic compound such as xanthene, thioxanthene, indoline, phenothiazine,

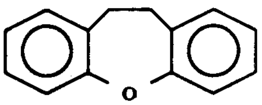

or

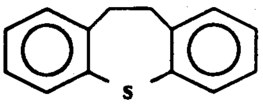

.

Further, as a group wherein the above groups are directly bonded to each other, the following monovalent or bivalent group may be mentioned. Namely, a monovalent or bivalent group derived from e.g biphenyl, terphenyl, phenylanthracene, bithiophene, terthiophene, bifuran, thienylbenzene, thienylnaphthalene, pyrrolylthiophene or N-phenylcarbazole, may be mentioned.

In the case of a group wherein the above rings are bonded by a linking group, the linking group may be an alkylene group such as

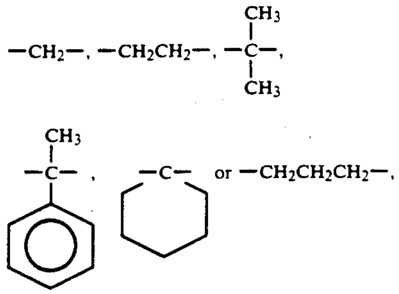

which may have a substituent, an alkenylene group such as

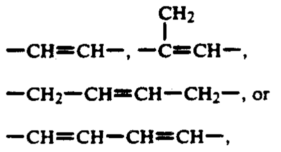

which may have a substituent

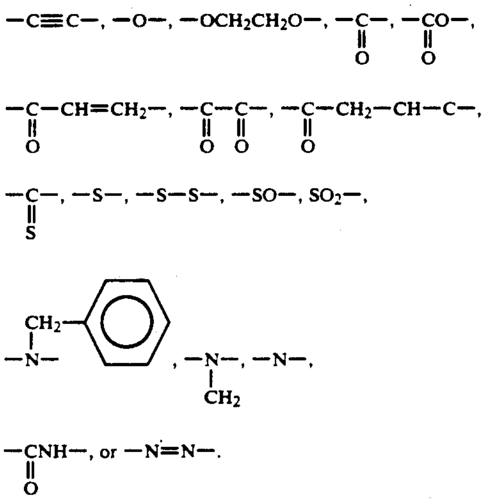

These linking groups may be used alone or in combination. The group formed by using such a linking group may be the one in which the above mentioned aromatic rings or hetero rings are bonded by such a linking group, such as diphenylmethane, stilbene, tolan, 1,4-diphenylbutadiene, diphenyl ether, diphenyl sulfide, N-methyldiphenylamine, triphenylamine or azobenzene. Further, there may be mentioned compounds wherein instead of the phenyl groups in the above examples, the foregoing aromatic hydrocarbon rings or hetero rings are bonded by such linking groups.

These aromatic hydrocarbon groups, aromatic hetero cyclic groups and groups derived from the compounds formed by direct bonding of such rings or by bonding of such rings by the linking groups, may have substituents. Such substituents include a lower alkyl group such as a methyl group, an ethyl group, a propyl group, a butyl group or a hexyl group; a lower alkoxy group such as methoxy group, an ethoxy group or a butoxy group; an allyl group; an aralkyl group such as a benzyl group, a naphthylmethyl group or a phenethyl group; an aryloxy group such as a phenoxy group or a tolyloxy group; an arylalkoxy group such as a benzyloxy group or a phenethyloxy group; an aryl group such as a phenyl group or a naphthyl group; an arylvinyl group such as a styryl group or a naphthylvinyl group; and a dialkylamino group such as a dimethylamino group or a diethylamino group. Further, the alkyl moiety in such a substituent may be substituted by an ether group, an ester group, a cyano group or a sulfide group.

In the formula (I), each of $R^1$, $R^2$, $R^3$, $R^4$ and $R^5$ may be a hydrogen atom, or a lower alkyl group such as a methyl group, an ethyl group, a propyl group, a butyl group or a hexyl group; an aralkyl group such as a benzyl group or a phenylethyl group; the same aromatic hydrocarbon group as in the definition of A such as a phenyl group, a naphthyl group, an acenaphthyl group , an anthracenyl group or a pyrenyl group; or the same heterocyclic group as in the definition of A such as a thienyl group, a bithienyl group, a carbazolyl group, an indolyl group, a furyl group or an indolinyl group. These groups may be substituted by substituents which include a lower alkyl group such as a methyl group, an ethyl group, an propyl group, a butyl group and a hexyl group; a lower alkoxy group such as a methoxy group, an ethoxy group or a butoxy group; an aryloxy group such as a phenoxy group or a tolyloxy group; and arylalkoxy group such as a benzyloxy group or a phenethyloxy group; an aryl group such as a phenyl group or a naphthyl group; and a substituted amino group such as a dimethylamino group, a diethylamino group, a phenylmethylamino group or a diphenylamino group. In addition, each of $R^1$, $R^2$, $R^3$, and $R^4$ and $R^5$ may be the same group as A other than those mentioned above. However, $R^1$ may together with A and the carbon atom to which $R^1$ is bonded, may form a ring. Such a ring may be, for example, as follows:

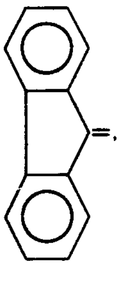,
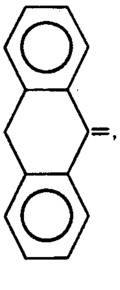,
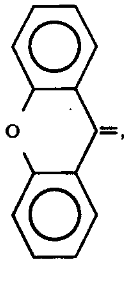,
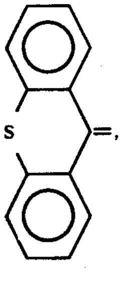,
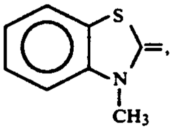,
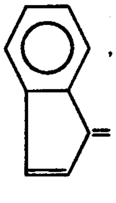,
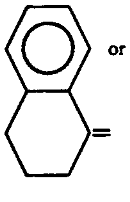
or
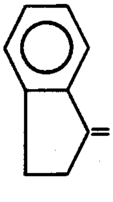

Each of $R^6$ and $R^7$ may be a lower alkyl group such as a methyl group, an ethyl group, a propyl group or a butyl group; an aralkyl group such as a benzyl group, a phenethyl group or a naphthylmethyl group; an allyl group; an aromatic hydrocarbon group such as a phenyl group or a naphthyl group; a heterocyclic group such as a pyridyl group, a thienyl group, a furyl group or a pyrrolyl group. These groups may be substituted by substituents similar to the substituents mentioned above with respect to $R^1$, $R^2$, $R^3$, $R^4$ and $R^5$. However, $R^6$ and $R^7$ may together with the nitrogen atom to which they are bonded, may form a ring. Such a ring may be, for example, as follows:

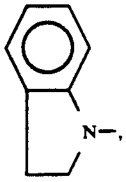,
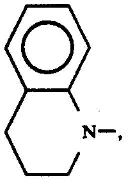,
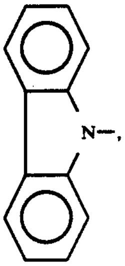,
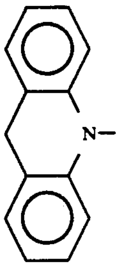
or
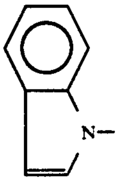

In the formula (I), n is 1 when A is a monovalent group, and 2 when A is a bivalent group.

The hydrazone compounds of the formula (I) can readily be prepared by a conventional method. For example, it can b e prepared by reacting a carbonyl compound of the following formula (II):

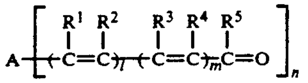

(II)

wherein A, $R^1$, $R^2$, $R^3$, $R^4$, $R^5$, l, m and n are as defined above with respect to the formula (I), with a hydrazine of the following formula (III):

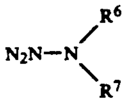

(III)

wherein $R^6$ and $R^7$ are as defined above with respect to the formula (I), or its salt such as its hydrochloride or sulfate, in a solvent inert to the reaction, such as an aromatic hydrocarbon such as benzene, toluene, chlorobenzene or nitrobenzene; an alcohol such as methanol, ethanol or butanol; an ether such as tetrahydrofuran, 1,2-dimethoxyethane or 1,4-dioxane; a cellosolve such as methylcellosolve or ethylcellosolve; N,N-dimethylformamide, dimethylsulfoxide, or N-methylpyrrolidone, at a temperature of from 10° to 200° C., preferably from 20° to 100° C.

To facilitate the reaction, p-toluenesulfonic acid, benzenesulfonic acid, hydrochloric acid, sulfuric acid potassium acetate, or sodium acetate may be added as the case requires.

Otherwise, a hydrazone of the above formula (I) may be prepared by reacting the carbonyl compound of the above formula (II) with a hydrazine of the following formula (IV):

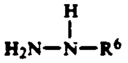
(IV)

wherein $R^6$ is as defined above with respect to the formula (I), in the same organic solvent inert to the reaction as mentioned above, if necessary, in the presence of a reaction accelerator such as p-toluenesulfonic acid, benzenesulfonic acid, hydrochloric acid, sulfuric acid or potassium acetate, to obtain a hydrazone of the following formula (V):

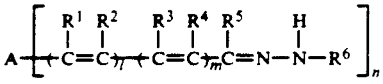
(V)

wherein A, $R^1$, $R^2$, $R^3$, $R^4$, $R^5$, $R^5$, $R^6$, l, m, and n are as defined above with respect to the formula (I), followed by the reaction with an alkylating agent, an arylating agent or an aralkylating agent of the following formula (VI):

$$R^7—X \quad (VI)$$

wherein $R^7$ is as defined above with respect to the formula (I), and X is a halogen atom or a p-toluenesulfonate group, or with a dialkyl sulfate such as dimethyl sulfate or diethyl sulfate in an organic solvent inert to the reaction, such as toluene, xylene, nitrobenzene, tetrahydrofuran, dioxane, N,N-dimethylformamide, N-methylpyrrolidone or dimethylsulfoxide, in the presence of an acid binding agent such as sodium hydroxide, potassium hydroxide, sodium carbonate, potassium carbonate, triethylamine, pyridine, ammonium trimethylbenzyl hydroxide, at a temperature of from 10° to 200° C.

Specific examples of the hydrazone compounds obtainable in such manner are listed in the following Table.

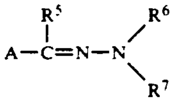

l = 0, m = 0, n = 1

A 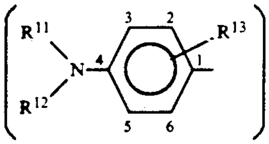

| $R^{11}$ | $R^{12}$ | $R^{13}$ | $R^5$ | $R^6$ | $R^7$ |
|---|---|---|---|---|---|
| $-C_2H_5$ | $-C_2H_5$ | H | H | 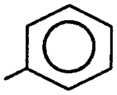 | 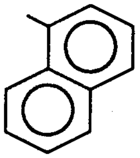 |
| " | " | 2-$OCH_3$ | " | " | 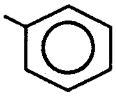 |
| 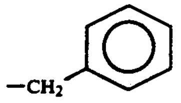 | 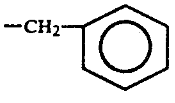 | 2-$CH_3$ | " | " | " |
| 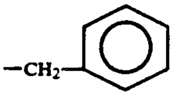 | 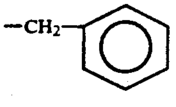 | H | H | 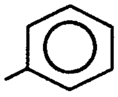 | 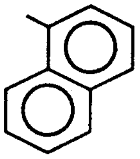 |

-continued
| | | | | | |
|---|---|---|---|---|---|
| 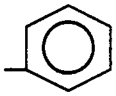 | 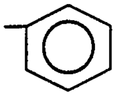 | " | " | " | 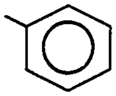 |
| $-CH_3$ | " | " | " | " | " |
| 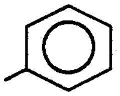 | " | " | " | " | 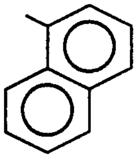 |
| 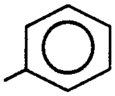 | 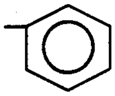 | H | $-CH_3$ | 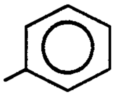 | 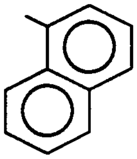 |
| " | 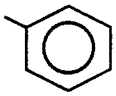 | " | H | $-CH_3$ | 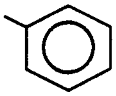 |
| " | 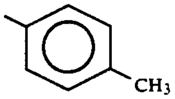 | " | " | $-CH_2-CH=CH_2$ | " |
| 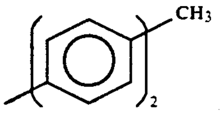 | 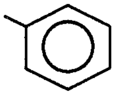 | " | " | 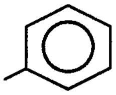 | " |
| 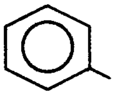 | 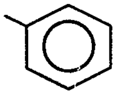 | H | H | 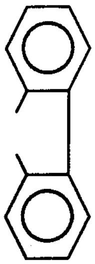 | |
| A | $R^5$ | $R^6$ | $R^7$ |
|---|---|---|---|
| 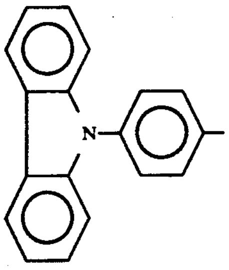 | H | 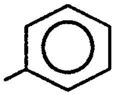 | 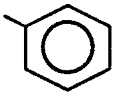 |

-continued
| | | | |
|---|---|---|---|
| 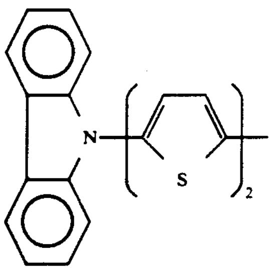 | H | 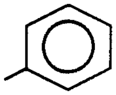 | 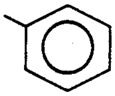 |
| 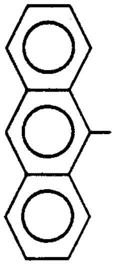 | " | " | " |
| 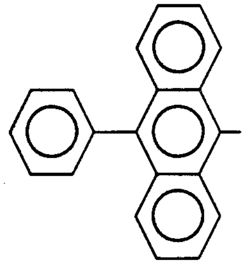 | " | " | " |
| 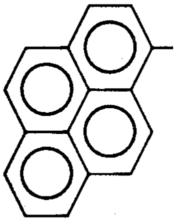 | " | " | " |
| 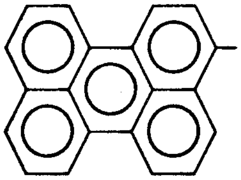 | H | 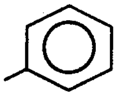 | 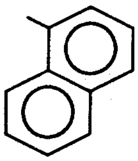 |
| 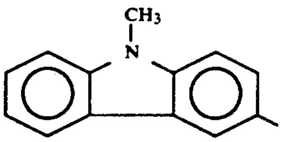 | " | " | " |
| " | " | " | 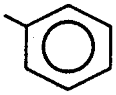 |

-continued
| | | | |
|---|---|---|---|
| 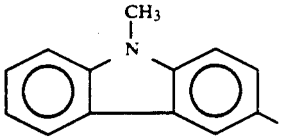 | " | 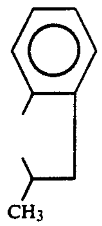 | |
| 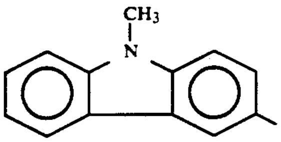 | 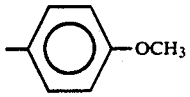 | 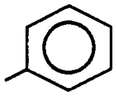 | 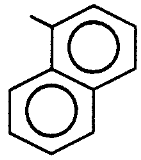 |
| 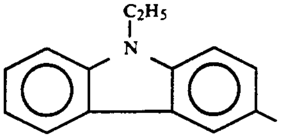 | H | $-CH_3$ | 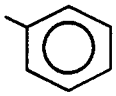 |
| " | " | 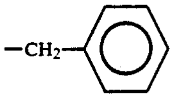 | " |
| " | " | 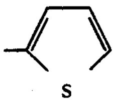 | " |
| 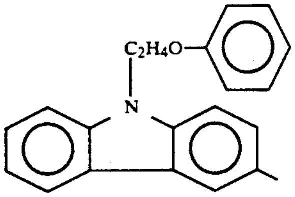 | H | $-CH_2CH{=}CH_2$ | 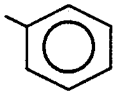 |
| 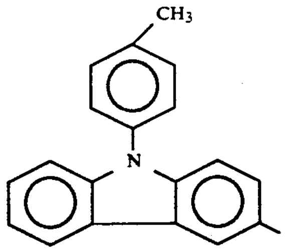 | " | 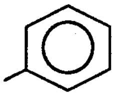 | " |
| 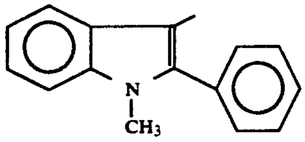 | " | " | 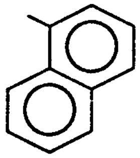 |
| 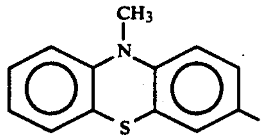 | " | " | 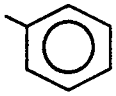 |

-continued
| | | | |
|---|---|---|---|
| 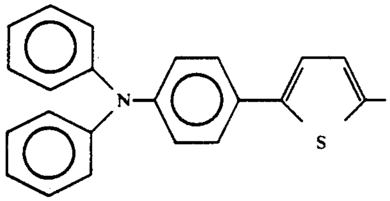 | H | 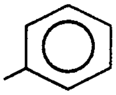 | 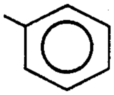 |
| 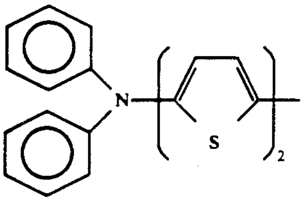 | " | " | 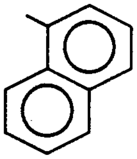 |
| 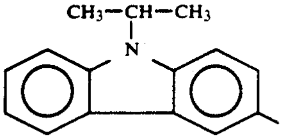 | " | " | 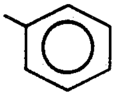 |
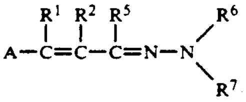
$l = 1$, $m = 0$, $n = 1$
| A | $R^1$ | $R^2$ | $R^5$ | $R^6$ | $R^7$ |
|---|---|---|---|---|---|
| 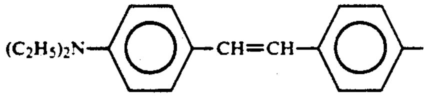 | —H | —H | —H | 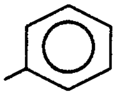 | 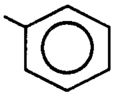 |
| 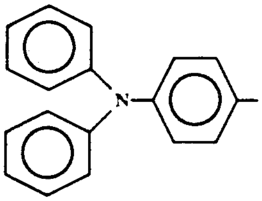 | " | " | " | " | " |
| " | " | " | " | 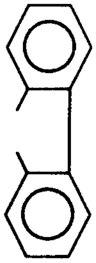 | |
| 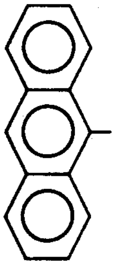 | " | " | " | 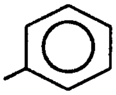 | 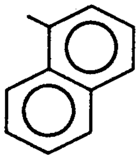 |

-continued
| | | | | | |
|---|---|---|---|---|---|
| 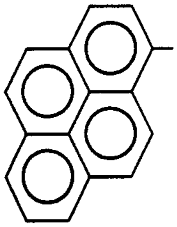 | —H | —H | —H | —$C_4H_9$(n) | 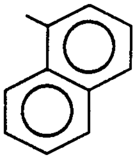 |
| 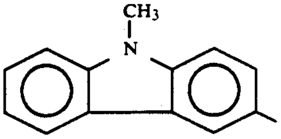 | " | " | " | 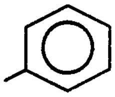 | 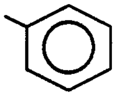 |
| 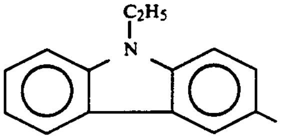 | " | " | —$CH_3$ | " | " |
| " | 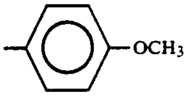 | " | —H | " | " |
| 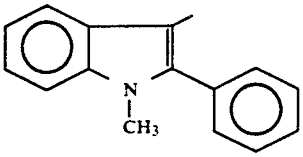 | H | H | 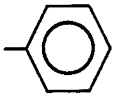 | 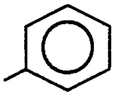 | 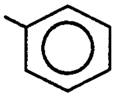 |
| 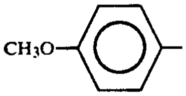 | 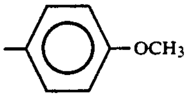 | " | H | " | " |
| 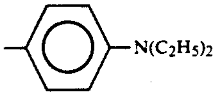 | 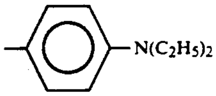 | " | " | " | 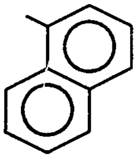 |
| 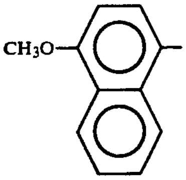 | 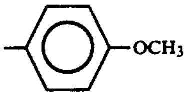 | " | " | " | " |
| 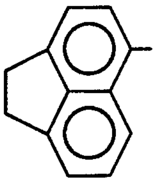 | 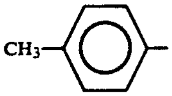 | " | " | " | 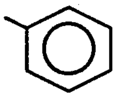 |

-continued
| | | | | | |
|---|---|---|---|---|---|
| 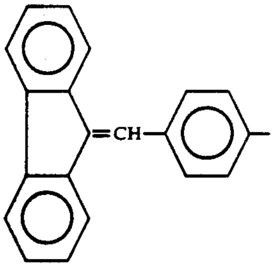 | H | H | H | 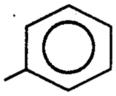 | 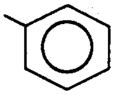 |
| 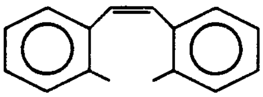 | | " | " | " | " |
| 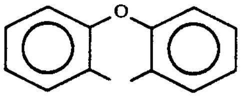 | | " | " | " | 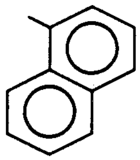 |
| " | | " | " | 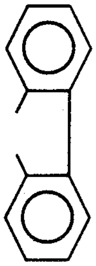 | |
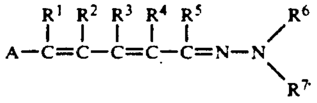
l = m = n = 1
| A | $R^1$ | $R^2$ | $R^3$ | $R^4$ | $R^5$ | $R^6$ | $R^7$ |
|---|---|---|---|---|---|---|---|
| 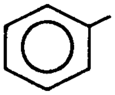 | 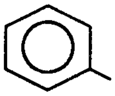 | H | H | H | H | 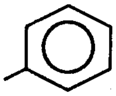 | 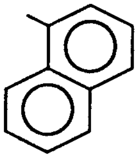 |
| 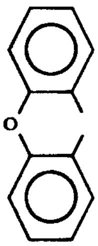 | | " | " | " | " | " | 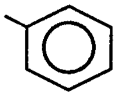 |

-continued
| | | | | | | |
|---|---|---|---|---|---|---|
| 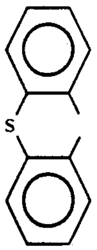 | " | " | " | " | " | " |
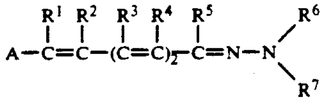
l = 1, n = 1, m = 2
| A | R1 | R2 | R3 | R4 | R5 | R6 | R7 |
|---|---|---|---|---|---|---|---|
| 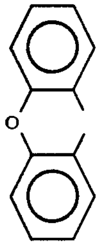 | H | H | H | H | H | 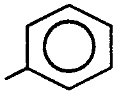 | 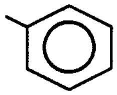 |
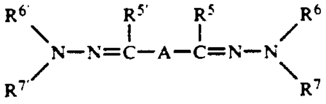
l = 0, m = 0, n = 2
| R7' | R6' | R5' | A | R5 | R6 | R7 |
|---|---|---|---|---|---|---|
| 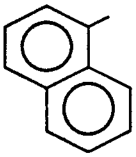 | 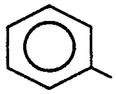 | H | 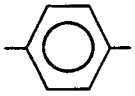 | H | 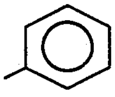 | 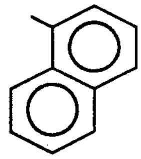 |
| 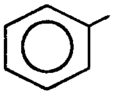 | " | " | 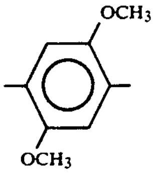 | " | " | 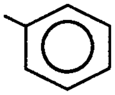 |
| " | " | " | 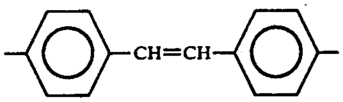 | " | " | 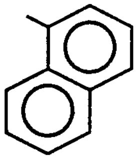 |
| 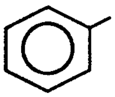 | 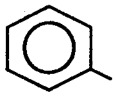 | H | 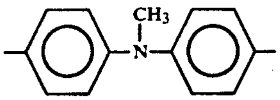 | H | 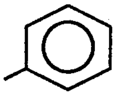 | 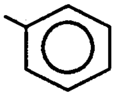 |
| " | " | " | 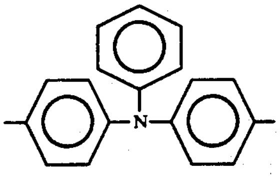 | " | " | " |

-continued

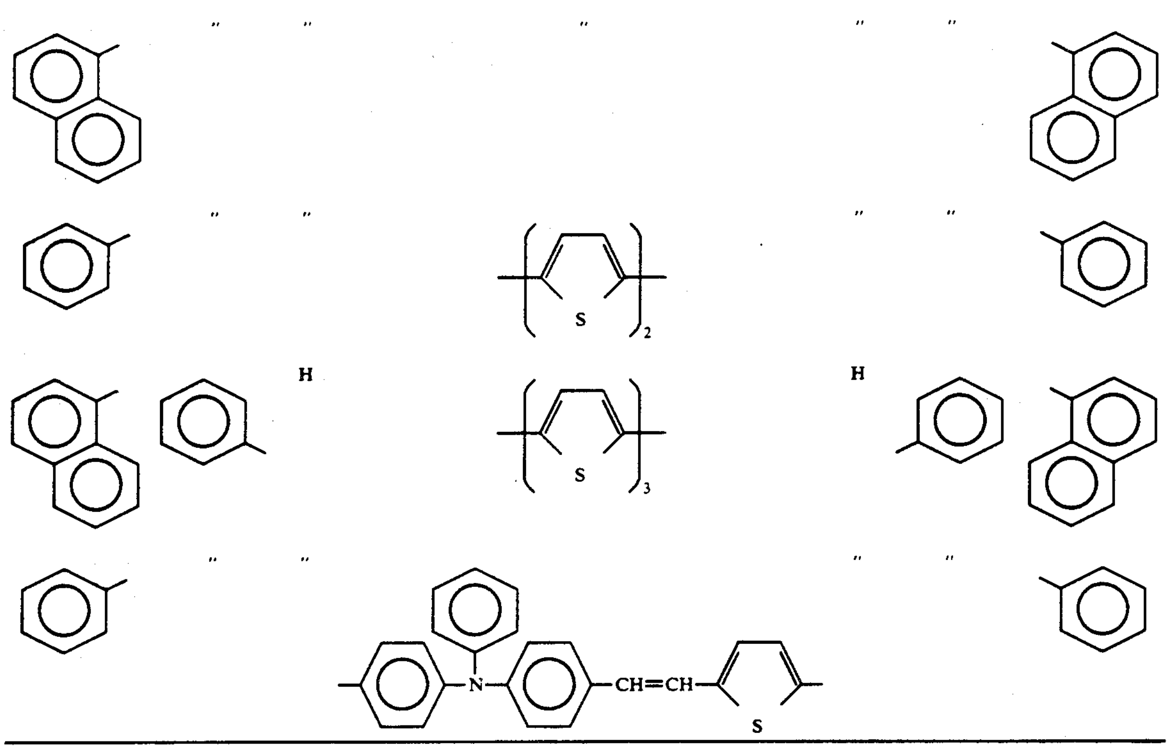

Among these hydrazone compounds, preferred are those wherein A is a monovalent or bivalent group having a condensed ring such as carbazole, pyrene or anthracene, or an aromatic ring or hetero ring substituted by an arylamino group, such as a triphenylamine or diphenylaminothiophene, and each of $F^6$ and $R^7$ is an aryl group such as a phenyl group or a naphthyl group.

The hole injection transport layer 3 is formed by depositing the hydrazone compound of the present invention on the above mentioned conductive layer 2*a* by a coating method or by a vacuum deposition method.

In the case of coating, a coating solution is prepared by adding and dissolving one or more hydrazone compounds of the present invention and, if necessary, a binder resin which will not trap a hole and an additive such as a coating property-improving agent such as a leveling agent, and the coating solution is applied on the conductive layer 2*a* by a method such as a spin coating method, followed by drying to form the hole injection transport layer 3. As the binder resin, a polycarbonate, a polyarylate or a polyester may, for example, be mentioned. If the amount of the binder resin is large, the hole mobility tends to decrease. Therefore the smaller the amount of the binder resin, the better. The amount is preferably at most 50% by weight.

The thickness of the hole injection transport layer is usually from 100 to 3,000 Å, preferably from 300 to 1,000 Å. A vacuum deposition method is commonly employed to uniformly form such a thin film. It frequently happens that an organic thin film formed by a vacuum deposition method aggregates and deteriorates when left to stand for a long period of time. In this respect, the hydrazone compounds of the present invention are superior. Usually a single hydrazone compound may be used for vapor deposition. However, in order to improve the stability of the film, two or more hydrazone compounds may be mixed or simultaneously vapor deposited to form a film. Further, in the case of vacuum deposition, it is preferred to employ a hydrazone compound having a high melting point which is thermally stable.

In FIG. 1, the organic luminescent layer 4 is usually deposited on the hole injection transfer layer 3. This layer plays a role of transporting an electron from the conductive layer 2*b* towards the hole injection transport layer 3 and a role of emitting light upon the recombination of the hole and the electron, simultaneously. As a material satisfying such a condition, an aromatic compound such as tetraphenylbutadiene or coumarin (Japanese Unexamined Patent Publication No. 51781/1982) or a metal complex such as an aluminum complex of 8-hydroxyquinoline (Japanese Unexamined Patent Publication No. 194393/1984) may be mentioned.

The thickness of the organic luminescent layer 4 is usually from 100 to 2,000 Å, preferably from 300 to 1,000 Å.

The organic luminescent layer 4 may also be formed by the same method as used for the formation of the hole injection transfer layer. However, a vacuum deposition method is usually employed.

Further, a structure opposite to the one shown in FIG. 1 may be addopted. Namely, it is possible to deposit a conductive layer 2*b*, an organic luminescent layer 4, a hole injection transport layer 3 and a conductive layer 2*a* on the substrate in this order. As described above, it is also possible to provide the electroluminescent device of the present invention between two substrates, at least one of which has high transparency.

According to the electroluminescent device of the present invention, the conductive layer (anode)/the hole injection transport layer/the luminescent layer/the conductive layer (cathode) are sequentially provided on the substrate, and yet a certain specific compound is employed for the hole injection transport layer, whereby light emittion having a practically sufficient luminance is obtainable at a low driving voltage, when a voltage is applied using the two conductive layers as electrodes, and it is possible to obtain a light emitting element having high stability without a decrease of the luminance even when stored for a long period of time. Accordingly, the electroluminescent device of the present invention is expected to be useful in the field of flat panel displays (such as wall-hanging type televisions), or as a light source utilizing the characteristics as the surface light emitting element (such as a light source for a coping machine, or a light source for the back light of liquid display devices or meters), a display board or a signal lamp. Thus, its technical value is significant.

Now, the present invention will be described in further details with reference to Examples. However, it should be understood that the present invention is by no means restricted to such specific Examples.

EXAMPLE 1

An electroluminescent device having the structure as shown in FIG. 1, was prepared. A transparent conductive film of indium-tin oxide (ITO) was formed in a thickness of 1,000 Å on a glass substrate, and a hydrazone compound of the following formula (1) was evaporated in a film thickness of 750 Å as a hole injection transfer layer thereon by vacuum deposition.

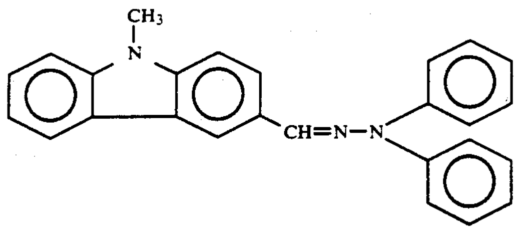
(1)

The pressure during the deposition was $1\times10^{-6}$ Torr, and the time for the vacuum deposition was 10 minutes.

Then, as an organic luminescent layer, a 8-hydroxyqunoline complex of aluminum Al $(C_9H_6NO)_3$ was vacuum deposited in a film thickness of 600 Å in the same manner as the hole injection transport layer. The pressure was $6\times10^{-7}$ Torr, and the time for the vacuum deposition was two minutes.

Finally, as a cathode, a magnesium electrode was vapor-deposited in a film thickness of 1,500 Å in the same manner by vacuum deposition.

Thus, an electric light emitting element having the structure as shown in FIG. 1 was prepared. A direct current voltage of 26 V was applied with the ITO electrode (anode) of this element being plus and the magnesium electrode (cathode) being minus, whereby uniform light emission with a luminance of 216 cd/m$^2$ was confirmed. This light emission was green, and the wave length of the peak was 540 um. The current density at that time was $3.8\times10^{-2}$ A/cm$^2$, and the luminous efficiency was 0.06 lm/W.

EXAMPLE 2

An electric light emitting element was prepared in the same manner as in Example 1 except that the compounds of the following formulas (2) to (7) were employed for the hole injection transport layer:

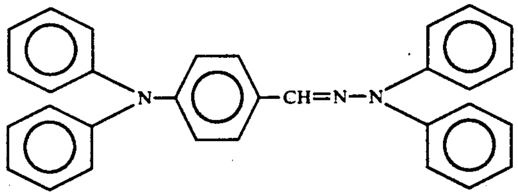
(2)

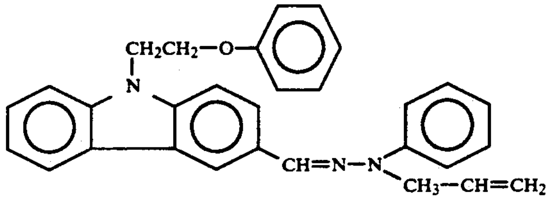
(3)

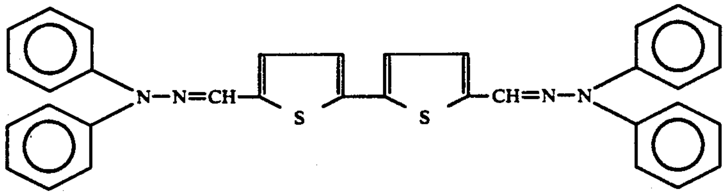
(4)

-continued

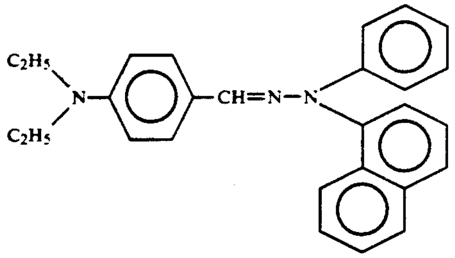

(5)

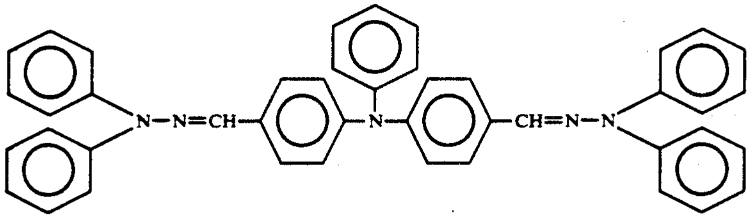

(6)

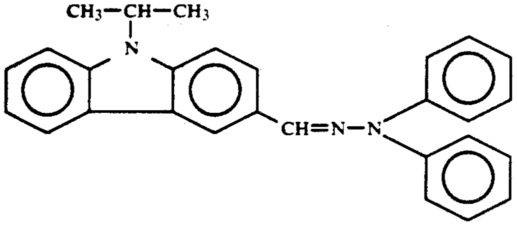

(7)

A voltage as identified in the following Table was applied to the element, and the light emitting properties were evaluated, in the same manner as in Example 1. The results are shown in the following Table.

Results of light emitting property tests

| Compound No. | Voltage (V) | Current density ($A/cm^2$) | Luminance ($cd/m^2$) | Luminous efficiency (m/V) | Film thickness (Å) |
|---|---|---|---|---|---|
| (2) | 32 | $1.4 \times 10^{-1}$ | 507 | 0.03 | 750 |
| (3) | 25 | $1.5 \times 10^{-2}$ | 96 | 0.08 | 610 |
| (4) | 32 | $1.2 \times 10^{-2}$ | 17 | 0.01 | 750 |
| (5) | 30 | $0.6 \times 10^{-2}$ | 9 | 0.02 | 770 |
| (6) | 26 | $7.6 \times 10^{-2}$ | 409 | 0.06 | 750 |
| (7) | 22 | $7.6 \times 10^{-2}$ | 354 | 0.07 | 750 |

Each element showed uniform light emission. These elements were left to stand in the atmosphere for one month, and then the luminance was measured again under the same condition, whereby no deterioration in luminance was observed in any element.

COMPARATIVE EXAMPLE 1

An electric light emitting element was prepared in the same manner as in Example 1 except that no organic hole injection transport layer was provided. A direct current voltage of 19 V was applied, whereby light emission was detected, but it was extremely non-uniform light emission. The luminance was 14 $cd/m^2$, the current density was $7.3 \times 10^{-2}$, and the luminance efficiency was 0.003 lm/W.

COMPARATIVE EXAMPLE 2

An electric light emitting element was prepared in the same manner as in Example 1 except that an aromatic diamine of the following formula (8) was evaporated in a thickness of 750 Å, without using the compound of the formula (I) used in the present invention as the organic hole injection transfer layer.

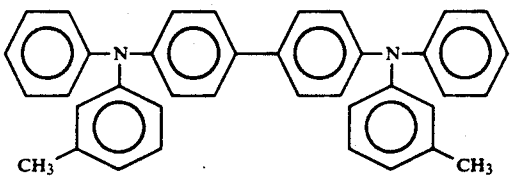

(8)

A direct current voltage of 26 V was applied, whereby the luminance was 115 $cd/m^2$, the current density was $1.8 \times 10^{-2}$ $A/cm^2$, and the luminous efficiency was 0.075 lm/W. This element was stored in atmosphere for one month, and then the luminance was measured again under the same condition, whereby it was found dropped to 10 $cd/m^2$, and the light emission was extremely non-uniform.

We claim:

1. An organic electroluminescent device having an organic hole injection transport layer and an organic luminescent layer formed between two conductive layers constituting electrodes, wherein the organic hole injection transfer layer contains a hydrazone compound of the following formula (I):

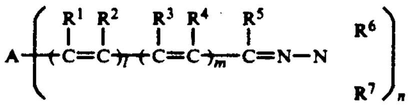

(I)

wherein A is a monovalent or bivalent organic group containing at least one aromatic hydrocarbon ring or aromatic hetero ring which may have a substituent, each of $R^1$, $R^2$, $R^3$, $R^4$ and $R^5$ is a hydrogen atom, or an alkyl, aralkyl, aromatic hydrocarbon or heterocyclic group which may have a substituent, each of $R^6$ and $R^7$ is an alkyl, aralkyl, aryl, aromatic hydrocarbon or heterocyclic group which may have a substituent, l is an integer of 0 or 1, m is an integer of 0, 1 or 2, and n is an integer of 1 or 2, provided that A, $R^1$ and the carbon atom to which $R^1$ is bonded, or $R^6$, $R^7$ and the nitrogen atom to which $R^6$ and $R^7$ are bonded, may bond to one another to form a ring.

2. The electroluminescent device according to claim 1, wherein A in the formula (I) is a monovalent or bivalent organic group derived from benzene, naphthalene, anthracene, pyrene, perillene, phenanthrene, fluororanthene, acenaphthene, acenaphthylene, azulene, fluorene, indene, tetracene, naphthacene, pyrrole, thiophene, furan, indole, carbazole, pyrazole, pyridine, acridine, phenazine, benzothiophene, benzofuran, xanthene, thioxanthene, indoline, phenothiazine,

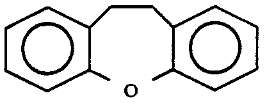

,

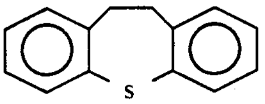

, biphenyl, terphenyl, phenylanthracene, bithiophene, terthiophene, bifuran, thienylbenzene, thienylnaphthalene, pyrrolylthiophene, N-phenylcarbazole, diphenylmethane, stilbene, tolan, 1,4-diphenylbutadiene, diphenyl ether, diphenyl sulfide, N-methyldiphenylamine, triphenylamine or azobenzene.

3. The electroluminescent device according to claim 1, wherein the substituent for the aromatic hydrocarbon ring or aromatic hetero ring, is selected from the group consisting of a lower alkyl group, a lower alkoxy group, an allyl group, an aralkyl group, an aryloxy group, an arylalkoxy group, an aryl group, an arylvinyl group and a dialkylamino group.

4. The electroluminescent device according to claim 3, wherein the alkyl moiety in the substituent is substituted by an ether group, an ester group, a cyano group or a sulfide group.

5. The electroluminescent device according to claim 1, wherein each of $R^1$, $R^2$, $R^3$, $R^4$ or $R^5$ is a hydrogen atom or a lower alkyl, benzyl, phenethyl, phenyl, naphthyl, acenaphthyl, anthracenyl, pyrenyl, thienyl, bithienyl, carbazolyl, indolyl, furyl or indolinyl group, which may be substituted by a lower alkyl group, a lower alkoxy group, an aryloxy group, an arylalkoxy group, an aryl group or a substituted amino group.

6. The electroluminescent device according to claim 5, wherein the substituent is selected from the group consisting of a methyl group, an ethyl group, a propyl group, a butyl group, a hexyl group, a methoxy group, an ethoxy group, a butoxy group, a phenoxy group, a tolyloxy group, a benzyloxy group, a phenethyloxy group, a phenyl group, a naphthyl group, a dimethylamino group, a diethylamino group, a phenylmethylamino group and a diphenylamino group.

7. The electroluminescent device according to claim 1, wherein the A, $R^1$ and the carbon atom to which $R^1$ is bonded, bond to one another to form a ring of the formula:

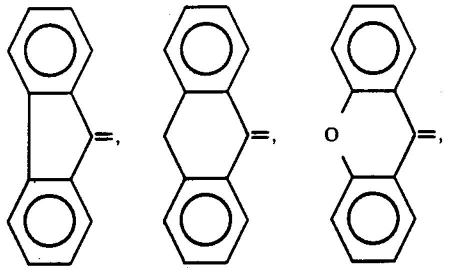

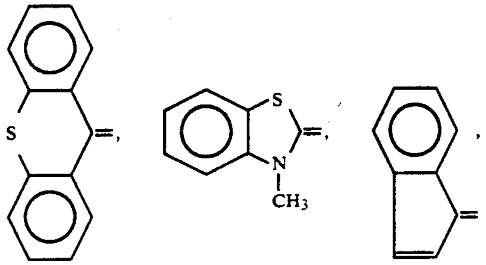

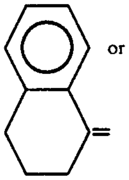

or

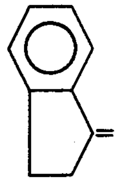

8. The light emitting element according to claim 1, wherein each of $R^6$ and $R^7$ is a lower alkyl, benzyl, phenethyl, naphthylmethyl, allyl, phenyl, naphthyl, pyridyl, thienyl, furyl or pyrrolyl group, which may be substituted by a lower alkyl group, a lower alkoxy group, an aryloxy group, an arylalkoxy group, an aryl group or a substituted amino group.

9. The electroluminescent device according to claim 8, wherein the substituent is selected from the group consisting of a methyl group, an ethyl group, a propyl group, a butyl group, a hexyl group, a methoxy group, an ethoxy group, a butoxy group a phenoxy group, a tolyloxy group, a benzyloxy group, a phenethyloxy group, a phenyl group, a naphthyl group, a dimethylamino group, a diethylamino group, a phenylmethylamino group and a diphenylamino group.

10. The electroluminescent device according to claim 1, wherein $R^6$, $R^7$ and the nitrogen atom to which $R^6$ and $R^7$ are bonded, bond to one another to form a ring of the formula:

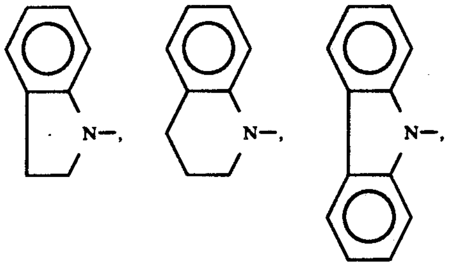

-continued
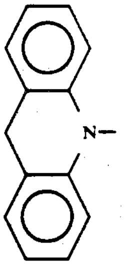
or
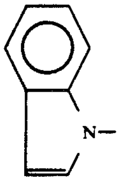
* * * * *